United States Patent
Chu et al.

(10) Patent No.: US 9,628,683 B2
(45) Date of Patent: Apr. 18, 2017

(54) SHADING DEVICE FOR THE LIGHT MODULE OF A SURVEILLANCE CAMERA

(71) Applicant: Topview Optronics Corp., New Taipei (TW)

(72) Inventors: Yi-Chih Chu, New Taipei (TW); Yu-Chuan Chang, New Taipei (TW)

(73) Assignee: Topview Optronics Corp., New Taipei (TW)

( * ) Notice: Subject to any disclaimer, the term of this patent is extended or adjusted under 35 U.S.C. 154(b) by 255 days.

(21) Appl. No.: 14/465,176

(22) Filed: Aug. 21, 2014

(65) Prior Publication Data

US 2015/0288860 A1 Oct. 8, 2015

(30) Foreign Application Priority Data

Apr. 3, 2014 (TW) .............................. 103112496 A (51) Int. Cl.
*G03B 17/00* (2006.01)
*H04N 5/225* (2006.01)
*H04N 7/18* (2006.01)

(52) U.S. Cl.
CPC ......... *H04N 5/2254* (2013.01); *H04N 5/2256* (2013.01); *H04N 7/183* (2013.01)

(58) Field of Classification Search
CPC .......... H04N 7/181; H04N 7/183; H04N 7/18; H04N 7/188; H04N 5/2251; H04N 5/2252; H04N 5/2253; H04N 5/2254; G08B 13/19656; G08B 13/1963; G08B 13/19619; G08B 13/19632; G03B 17/00; F16M 11/18

USPC .......................................... 348/143; 396/427
See application file for complete search history.

(56) References Cited

U.S. PATENT DOCUMENTS

| | | | | |
|---|---|---|---|---|
| 4,833,534 A | * | 5/1989 | Paff .................... | H04N 7/183 348/151 |
| 2011/0085036 A1 | * | 4/2011 | Kong .................. | H04N 5/2251 348/143 |
| 2011/0096164 A1 | * | 4/2011 | Mori ...................... | G02B 7/003 348/143 |
| 2012/0086849 A1 | * | 4/2012 | Wada .................. | G02B 26/007 348/344 |
| 2013/0169805 A1 | * | 7/2013 | Park ................. | G08B 13/19619 348/143 |

\* cited by examiner

*Primary Examiner* — Sinh Tran
*Assistant Examiner* — Selam Gebriel
(74) *Attorney, Agent, or Firm* — Muncy, Geissler, Olds & Lowe, P.C.

(57) ABSTRACT

A shading device for the light module of the surveillance camera, wherein the light module rotates, with the filming module of the camera, back and forth between the vertical axis and horizontal axis of the camera. The shading device includes a shading shield that can moves back and forth between the first position and the second position. When the light module and the filming module rotate to a preset angle zone that is near the horizontal axis, the shading shield will move with the light module and the filming module, and the shading shield shades part of the light emitted by the light module that the part of light will not project onto the reflective object of the camera.

9 Claims, 8 Drawing Sheets

SHADING DEVICE FOR THE LIGHT MODULE OF A SURVEILLANCE CAMERA

BACKGROUND

Technical Field

The disclosure relates to the camera of a surveillance system. Furthermore, the camera has a rotatable lens module and a light module. In this disclosure, a shading device is installed in the camera that when the lens module and the light module rotate to a preset angle zone, the shading device can shade part of the light emitted by the light module onto the reflective object of the camera.

Description of Related Art

Figure 1:
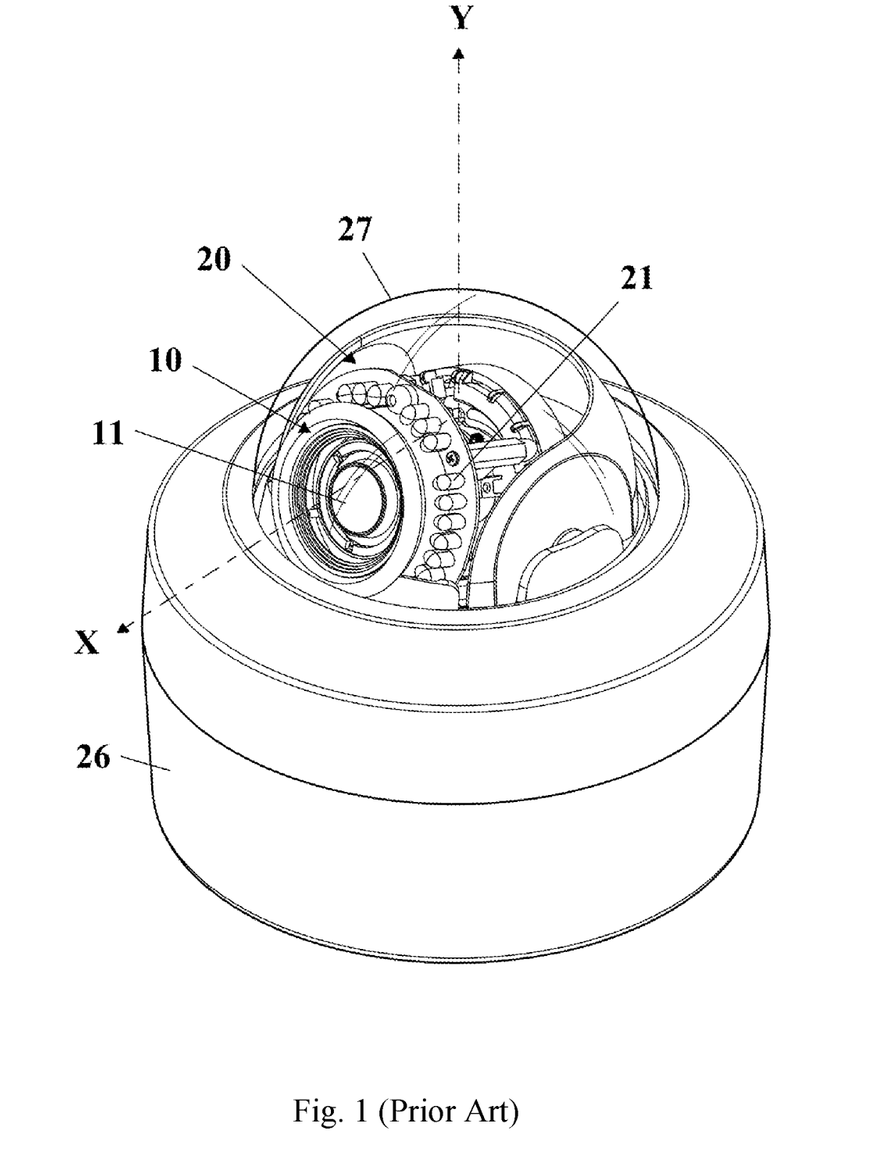
FIG. 1 is the outside view of a dome camera.

FIG. 1 shows a dome camera used in a surveillance system. It has a rotatable filming module (10) and a rotatable light module (20). The LED (21) of the light module (20) is set around the lens (10) of the filming module. The filming module (10) and the light module (20) are connected to a base frame with a support shaft; the reflective case (26) and the transparent dome cover (27) envelop and fasten the above mentioned 2 modules and the base frame inside.

The light module provides light source to make the images taken by the lens clear. The light module rotates with the filming module. The rotation here means that the filming module and the light module rotate using the support shaft that is connected to the base frame as center. The maximum angle zone of the rotation should be 90 degrees back and froth from the vertical axis Y to the horizontal axis X of the camera.

However, the above mentioned maximum angle zone can not be put into reality. Mainly because that when the filming module and the light module rotate about 60 degrees from the vertical axis Y to the horizontal axis X, a part of the light emit from the LED (21) of the light module (20) will project on the inside of the reflective case (26) and result in non-directional reflected light, which is leaked onto the lens after multiple reflection or via a light conductor such as the dome top (27) and overexposes the images taken. So the images taken between 60 degrees and the horizontal axis X are all overexposed and unclear. For avoiding this problem, the rotating angle of the filming module and the light is set to be less than 60 degrees. Nevertheless, the angle zone limits also the filmable angle zone of the filming module.

SUMMARY

The inventor of this disclosure thinks that solving the problem of image overexposure by limiting the filmable zone of the filming module to avoid the reflected light of the light module onto the reflective object is inappropriate. Therefore, the inventor presents a shading device that can shade the part of light from the light module onto the reflective object of the camera.

A shading device for the light module of the surveillance camera, wherein the light module rotates, with the filming module of the camera, back and forth between the vertical axis and horizontal axis of the camera. The shading device includes a shading shield that can moves back and forth between the first position and the second position. When the light module and the filming module rotate to a preset angle zone that is near the horizontal axis, the shading shield will move with the light module and the filming module, and the shading shield shades part of the light emitted by the light module that the part of light will not project onto the reflective object of the camera.

The effect of the present invention:

When the filming module and the light module rotate to a preset angle zone that is near the horizontal axis, the shading shield will shade part of the light emitted by the light module that the part of light will not project onto the reflective object. The problem of image overexposure caused by the reflected light of the light module onto the reflective object is solved. The reflective object here includes the reflective case of the camera.

When the filming module and the light module rotate more than 60 degrees from the vertical axis Y to the horizontal axis X, the shading shield still shades part of the LED light that it will not project onto reflective object.

By solving the problem of image overexposure resulted by the reflected light on the lens, this invention also enlarges the filming angle zone. The rotating angle of the filming module and the light module can allow 90 degrees back and forth filming angle from the vertical axis Y to the horizontal axis X without problems of image overexposure within this angle zone.

DETAILED DESCRIPTION OF THE PREFERRED EMBODIMENT

In the following detailed description, for purposes of explanation, numerous specific details are set forth in order to provide a thorough understanding of the disclosed embodiments. It will be apparent that the drawings of the components are to illustrate the relative proportion, size, deformation or displacement and are not the real proportion of the components. In the following detailed description, similar components are marked with the same number.

Figure 2:
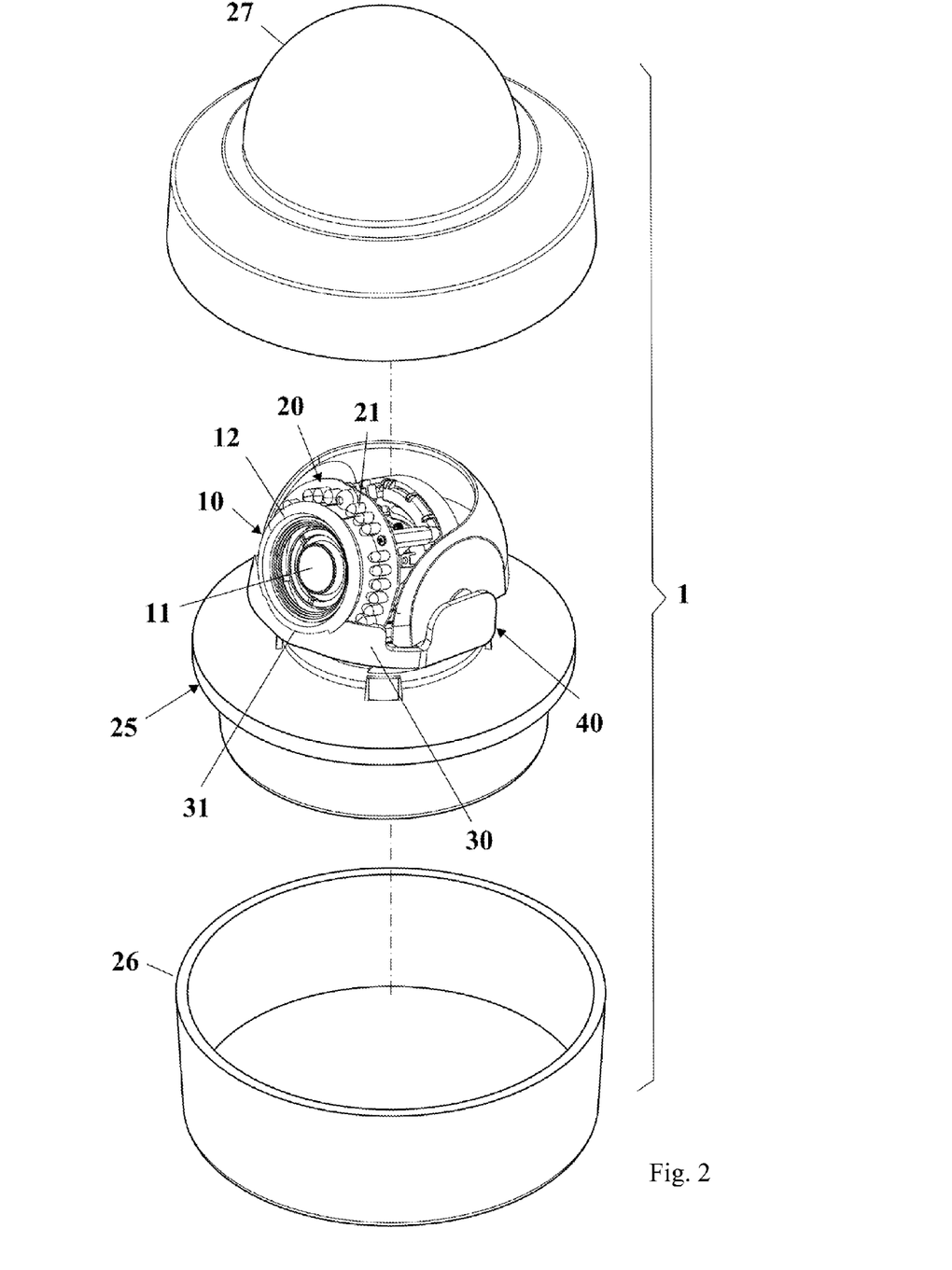
FIG. 2 is the exploded view of the current invention.

FIG. 1 and FIG. 2 are the disclosure of a surveillance camera (1) which includes a rotatable filming module (10) and a rotatable light module (20). The LED (21) of the light module (20) is set around the lens (11) of the filming module (10). The filming module (10) and the light module (20) are connected to the base frame (25) with a support shaft (22) (shown in FIG. 4). The light module (20) and the filming module (10) rotate, with the support shaft (22) as center, back and forth between the vertical axis Y and the horizontal axis X of the camera (1). The reflective case (26) and the transparent dome cover (27) envelop and fasten the above mentioned filming module (10), light module (20) and the base frame (25) inside.

Figure 3:
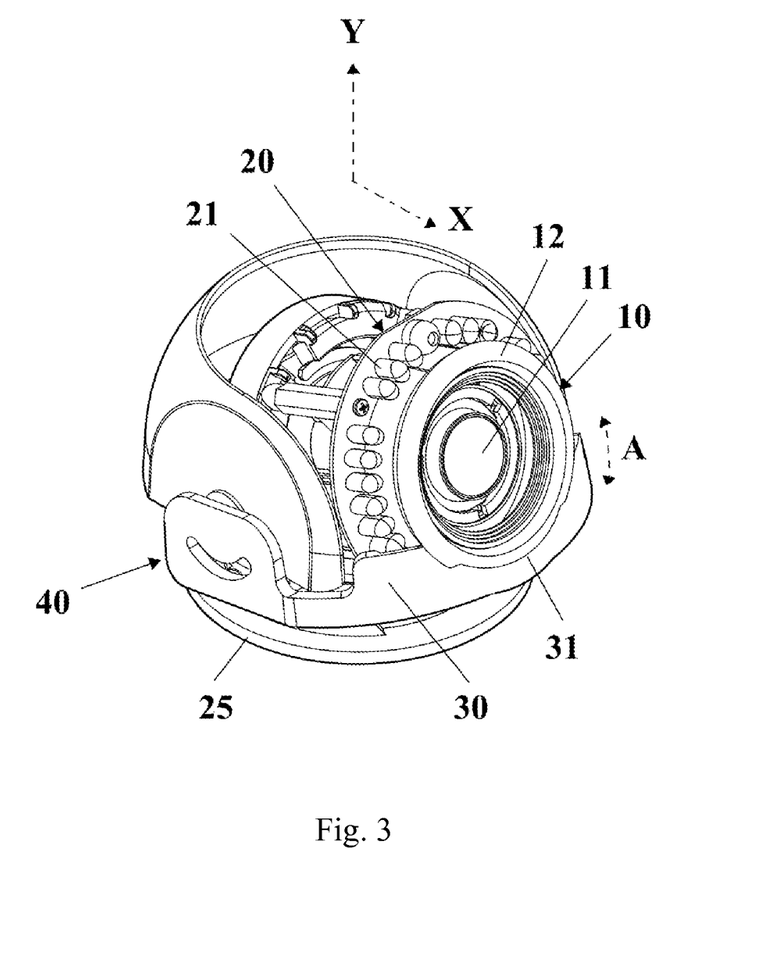
FIG. 3 is the outside view of the shading shield of the current invention combined with the filming module and the light module.
Figure 4:
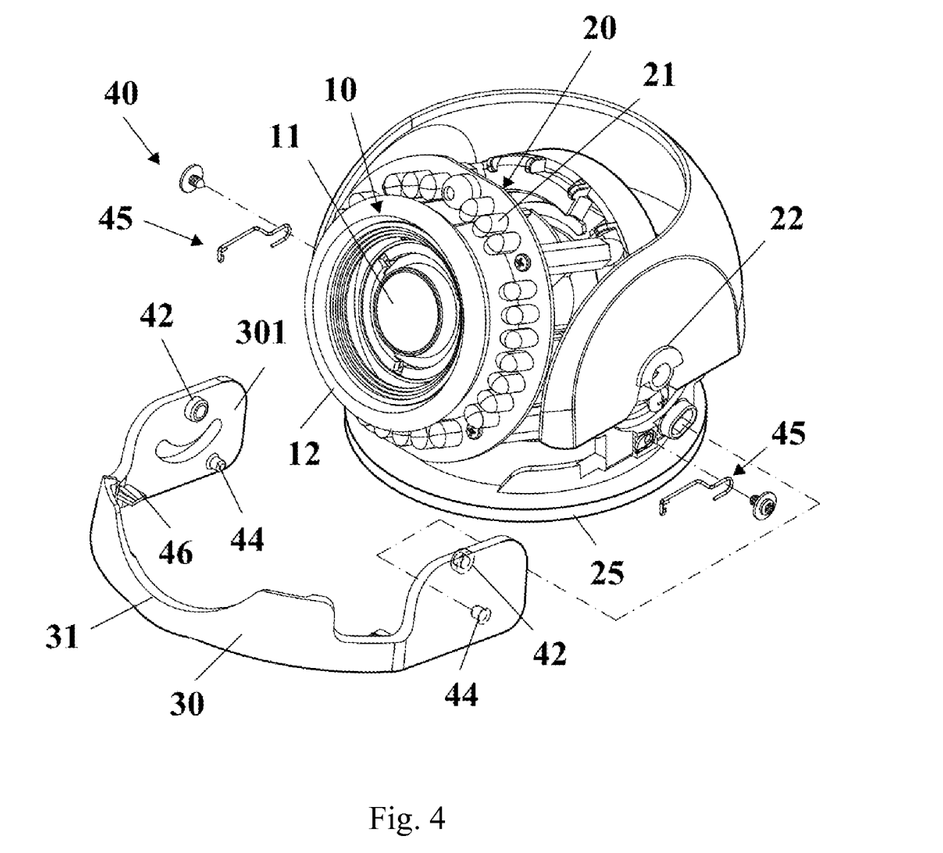
FIG. 4 is the exploded view of the shading shield of the current invention combined with the filming module and the light module.

As shown in FIG. 3 and FIG. 4, the shading shield (30) of the current invention is installed on the base frame (25). The shading shield is of crescent shape with its two ends connected to both sides of the base frame (25) via the pivot joints. A concave contacting part (31) situated at the top center of the shading shield (30) is to contact the beam stopper ring (12) surrounding the lens (11) of the filming module (10). The shading shield (30) is installed on the base frame (25) via an assembling structure (40). The assembling structure (40) is set on the two sides (251) of the base frame (25) and the two inner sides (301) of the shading shield (30). As shown in "A" of FIG. 3, the assembling structure (40) allows the shading shield (30) to move back and forth between a first position (described in FIGS. 6 and 7) and a second position (described in FIG. 8), the rotatable angle zone is 25-30 degrees.

Figure 5:
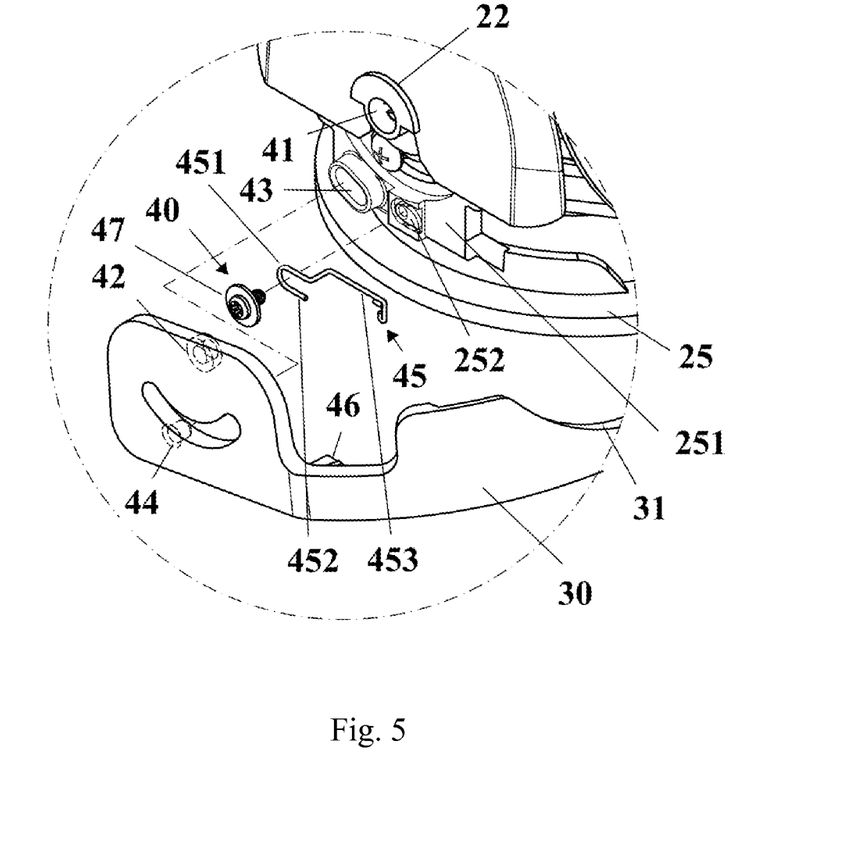
FIG. 5 is the exploded assembly view of the shading shield of the current invention combined with the filming module and the light module.

As shown in FIG. 5, each assembling structure (40) includes a pivot sleeve (41) and a pivot shaft (42), a stopper sleeve (43) and a stopper member (44), a retractile spring (45) and a spring arm control key (46) that set on the two sides (251) of the base frame (25) and the two inner sides (301) of the shading shield (30).

The above mentioned pivot sleeve (41) and the pivot shaft (42) can be combined. The pivot sleeve (41) is a circular slot or a round hole. The pivot shaft (42) is a cylinder and can move within the pivot sleeve (41) which allows the shading shield (30) to rotate circularly around the pivot sleeve (41) and the pivot shaft (42).

The above mentioned stopper sleeve (43) can contain the stopper member (44) and allow the stopper member (44) to slide within it. The stopper sleeve (43) and the stopper member (44) are set according to the rotating amplitude of the shading shield (30). The stopper sleeve (43) is a long slot and the stopper member (44) is cylinder. The rotation of the shading shield (30) makes the stopper member (44) to slide in the stopper sleeve (43), and the sliding distance of the stopper member (44) within the stopper sleeve (43) decides the rotating angle field of the shading shield (30).

Figure 6:
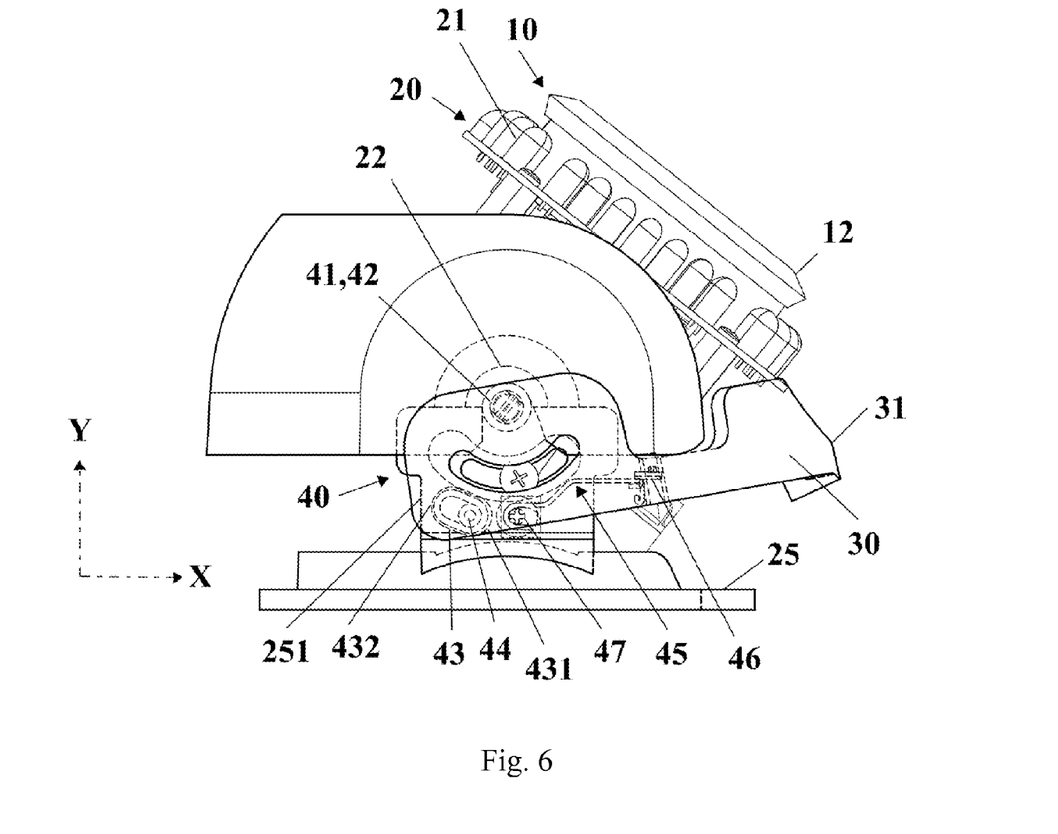
FIG. 6 is one side view and the schematic diagram of the operation of the shading shield of the current invention combined with the filming module and the light module.
Figure 7:
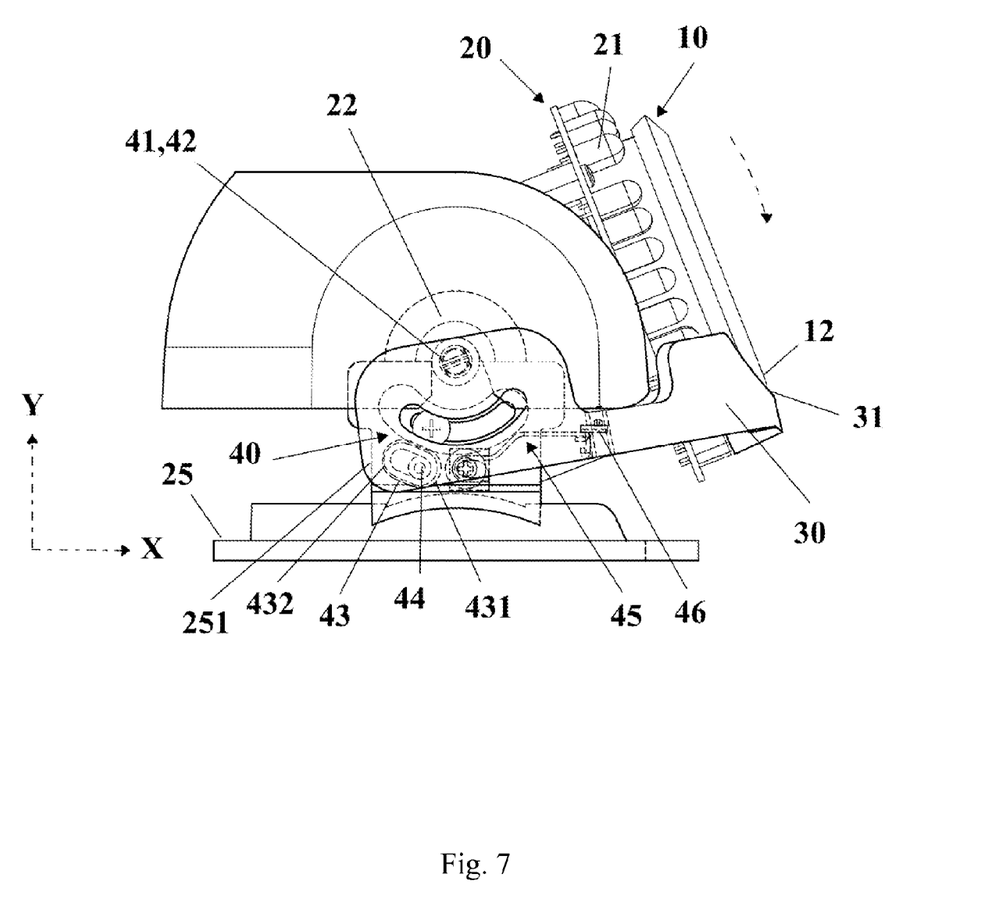
FIG. 7 is another side view and the schematic diagram of the operation of the shading shield of the current invention combined with the filming module and the light module.
Figure 8:
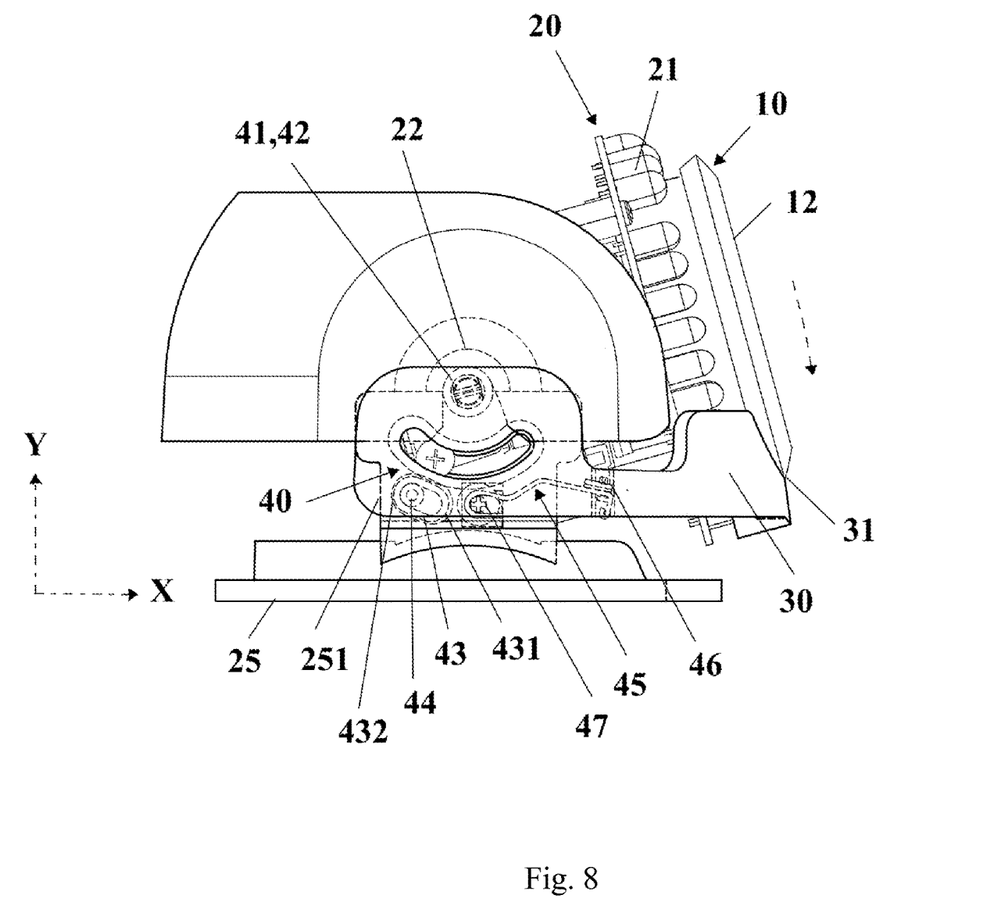
FIG. 8 is another side view and the schematic diagram of the operation of the shading shield of the current invention combined with the filming module and the light module.

The above mentioned retractile spring (45) is a torsion spring, the torsion part (451) is positioned in the spring groove (252) situated on the side (251) of the base frame (25) via a positioning component (47). The loading arm (452) of the torsion spring (45) is supported by the side (251) of the base frame (25). The forcing arm (453) of the torsion spring (45) is extended to a distance that the spring arm control key (46) is in contact with the free end of the forcing arm (453). The external force generated by the rotation of the shading shield (30) can be applied on the torsion spring (45) via the spring arm control key (46). And the retractile force generated by the torsion spring (45) can also be applied on the shading shield (30) via the spring arm control key (46). The main function of the torsion spring (45) is to control the shading shield (30) to come back from the second position to the first position. FIG. 6, FIG. 7 and FIG. 8 show the side views of the filming module (10), the light module (20) and the shading shield (30) in order to demonstrate their positions, operations and relations. When the light module (20) and the filming module (10) rotate to a preset angle zone near the horizontal axis X, the shading shield (30) shades part of the light emitted by the LED (21) of the light module (20) that the LED (21) light will not project on the reflective object of the camera.

As shown in FIG. 6, the filming module (10) and the light module rotate back and forth between the vertical axis Y and the horizontal axis X of the camera (1) using the support shaft (22) installed on the base frame (25) as center. The shading shield (30), by means of the elastic force provided by the torsion spring (45) and the stopper set by the stopper sleeve (43) and stopper member (44), will stay at the first position using the pivot sleeve (41) and pivot shaft (42) as fulcrum. When at the first position, the angle between the bottom (301) of the shading shield (30) and the horizontal axis X of the camera (1) is about 25-30 degrees. The stopper member situates at the first end (431) at the stopper sleeve (43).

As shown in FIG. 7, the filming module (10) and the light module rotate a preset angle (60 degrees) toward the horizontal axis X of the camera (1) using the support shaft (22) installed on the base frame (25) as center. The beam stopper ring (12) surrounding the lens (11) touches the contacting part (31) of the shading shield (30) and part of the LED (21) situated at the lower side of the lens (11) will be inside the shading shield (30). The shading shield (30) shades that part of light emitted by the LED (21) and prevents it from projecting on the inner wall of the reflective case (26). The problem of image overexposure resulting from the light reflection on the lens caused by light projecting on the reflective case (26) from part of the LED (21) is thus solved.

As shown in FIG. 8, the filming module (10) and the light module rotate still nearer toward the horizontal axis X of the camera (1) using the support shaft (22) installed on the base frame (25) as center. During the process, the edge of the beam stopper ring (12) surrounding the lens (11) exercises a pressing force on the contacting part (31) of the shading shield (30). The shading shield (30) then moves from the position toward the second position with the light module (20) and the filming module (10), using the pivot sleeve (41) and pivot shaft (42) as fulcrum. The stopper member (44) also moves from the first end (431) toward the second end (432) of the stopper sleeve (43). The external force generated by the rotation of the shading shield (30) is applied on the forcing arm (453) of the torsion spring (45) via the spring arm control key (46) and presses the torsion spring (45) to make it store energy till the stopper member (44) reaches the second end (432) of the stopper sleeve (43). The shading shield (30) stops at the second position where the angle between the bottom (301) of the shading shield (30) and the horizontal axis X of the camera (1) is 0.

In the processes as shown in FIG. 7 and FIG. 8, a part of the LED (21) of the light module (20) surrounding the lens (11) is at the inner side of the shading shield (30). The shading shield (30) shades that part of LED (21) light to prevent it from projecting on the inner wall of the reflective case (26). In other words, when the filming module (10) and the light module (20) rotate to a present angle zone near the horizontal axis X, the shading shield (30) keeps shading a part of light from the light module (20) to prevent that part of light from projecting on the inner wall of the reflective case (26).

In the description of the disclosure, the image overexposure is explained as a result of reflected light from the light projecting on the reflective case (26). However, it is not the only case. Light projecting on any reflective object of the camera can cause the same problem. The reflective case (26) is one of the reflective objects of the camera. Thus, while only the reflective case.

Also, the filming module (10) and the light module can also rotate from the horizontal axis X to the vertical axis Y using the support shaft (22) installed on the base frame (25) as center. In this reverse rotation process, the elastic force released by the torsion spring (45) is applied on the shading shield (30) via the spring arm control key (46). The shading shield (30) rotates reversely with the filming module (10)

and the light module (20), form the second position shown in FIG. 8 to the first position shown in FIG. 6 and FIG. 7.

As shown in FIG. 6 to FIG. 8, if the shading shield (30) in this disclosure is removed, when the filming module (10) and the light module (20) rotate 60 degrees or more from the vertical axis Y to the horizontal axis X, part of the LED (21) light will project on the inner wall of the reflective case (26) and the reflected light will result in the image overexposure. To solve this problem, the rotation angle of the filming module (10) and the light module (20) is set to be less then 60 degrees thus the filming angle zone is limited.

With the shading shield (30) of this disclosure, the above mentioned problem can be totally resolved. Even when the filming module (10) and the light module (20) rotate 60 degrees or more from the vertical axis Y to the horizontal axis X, the LED (21) light will not project on the inner wall of the reflective case (26) because the shading shield (30) keeps shading part of the LED (21) light. The problem of image overexposure due to the reflected light is solved. While resolving the problem of overexposure, the filming angle zone is enlarged because of the shading shield (30) of this disclosure. The possible filming angle zone allows filming module (10) and the light module (20) to rotate 90 degrees back and forth from the vertical axis Y to the horizontal axis X.

What is claimed is:

1. A shading device for a light module of a surveillance camera, wherein the light module rotates, with a filming module of a camera, back and forth between a vertical axis and a horizontal axis of the camera, the shading device including:
    a shading shield that can moves back and forth between a first position and a second position,
    wherein when the light module and the filming module rotate 60 to 90 degrees from the vertical axis to the horizontal axis, the filming module and the light module move the shading shield back and forth between the first position and the second position, and the shading shield shades part of the light emitted by the light module that the part of light will not project onto a reflective object of the camera.

2. The shading device for the light module of the surveillance camera of claim 1, wherein the shading shield is of crescent shape with its two ends connected to both sides of a base frame via a pivot joints.

3. The shading device for the light module of the surveillance camera of claim 1, wherein an edge of the shading shield has a contacting part that can contact the filming module; when the light module and the filming module rotate to the angle range of 60 to 90 degrees that is mentioned above, the filming module contacts the contacting part of the shading shield and moves the shading shield back and forth between the first position and the second position.

4. The shading device for the light module of the surveillance camera of claim 1, wherein the shading shield has an assembling structure, the assembling structure including:
    a pivot sleeve and a pivot shaft that are set on the base frame and the shading shield, and a retractile spring;
    the pivot sleeve and the pivot shaft fit together and allow the shading shield to rotate using the pivot sleeve and the pivot shaft as center; the retractile spring is set on the base frame and keeps the shading shield stay at the first position with its elastic force; and when the shading shield moves from the first position to the second position, the retractile is pressed to store energy.

5. The shading device for the light module of the surveillance camera of claim 4, wherein the retractile spring is a torsion spring; a torsion part of the retractile spring is positioned in a spring groove situated on the base frame via a positioning component; the loading arm of the retractile spring is supported by the base frame; a forcing arm of the retractile spring is extended to a distance that a spring arm control key is in contact with the free end of the forcing arm.

6. The shading device for the light module of the surveillance camera of claim 4, where in the assembling structure further includes a stopper sleeve and a stopper member are set on the base frame according to a rotating amplitude of the shading shield; the stopper sleeve can contain the stopper member and allow the stopper member to slide within it; the sliding distance of the stopper member within the stopper sleeve decides a rotating angle field of the shading shield.

7. The shading device for the light module of the surveillance camera of claim 6, where in the stopper sleeve is a long slot and the stopper member is cylinder.

8. The shading device for the light module of the surveillance camera of claim 4, where in the angle between the bottom of the shading shield and the horizontal axis X of the camera is about 25-30 degrees when at the first position.

9. The shading device for the light module of the surveillance camera of claim 8, where in the angle between the bottom of the shading shield and the horizontal axis X of the camera is 0 degree when at the second position.

* * * * *